(12) United States Patent
Fountoulakis

(10) Patent No.: US 6,513,460 B2
(45) Date of Patent: Feb. 4, 2003

(54) RETAINING AND GUIDING CONFIGURATION

(76) Inventor: Tzanis Fountoulakis, Zum Tellbach 56, D-32107 Bad Salzuflen (DE)

( * ) Notice: Subject to any disclaimer, the term of this patent is extended or adjusted under 35 U.S.C. 154(b) by 0 days.

(21) Appl. No.: 09/781,653

(22) Filed: Feb. 12, 2001

(65) Prior Publication Data

US 2001/0015179 A1 Aug. 23, 2001

Related U.S. Application Data

(63) Continuation of application No. PCT/DE01/00085, filed on Jan. 11, 2001.

(30) Foreign Application Priority Data

| Feb. 10, 2000 | (DE) | ................................. 200 02 421 U |
| Mar. 15, 2000 | (DE) | ..................................... 100 12 699 |
| Sep. 13, 2000 | (DE) | ..................................... 100 45 493 |

(51) Int. Cl.⁷ ............................................. A01K 27/00
(52) U.S. Cl. .................... 119/770; 119/856; 119/857
(58) Field of Search ................................ 119/770, 856, 119/857, 863, 792, 793, 797, 798

(56) References Cited

U.S. PATENT DOCUMENTS

| 4,266,511 A | * | 5/1981 | Muench ........................ 199/858 |
| 5,184,573 A | * | 2/1993 | Stevens, Jr. |
| 5,501,180 A | * | 3/1996 | Beere ........................... 119/858 |
| 5,848,576 A | * | 12/1998 | Colaianni .................... 119/770 |
| 5,873,328 A | * | 2/1999 | Campbell .................... 119/798 |
| 5,915,336 A | * | 6/1999 | Watson ........................ 119/797 |
| 6,125,793 A | * | 10/2000 | Petty ........................... 119/856 |
| 6,216,636 B1 | * | 4/2001 | Butchko ...................... 119/497 |

* cited by examiner

Primary Examiner—Yvonne R. Abbott
(74) Attorney, Agent, or Firm—Laurence A. Greenberg; Werner H. Stemer; Ralph E. Locher

(57) ABSTRACT

A retaining and guiding configuration may serve as a lead replacement and is always carried along without a person or animal being impeded. The configuration includes an inwardly directed inner band and an outer band guided over the outside of the inner band. The outer band is configured such that it can be lengthened or extended elastically counter to a restoring force.

19 Claims, 2 Drawing Sheets

RETAINING AND GUIDING CONFIGURATION

CROSS-REFERENCE TO RELATED APPLICATION

This application is a continuation of copending International Application No. PCT/DE01/00085, filed Jan. 11, 2001, which designated the United States.

BACKGROUND OF THE INVENTION

Field of the Invention

The invention relates to a retaining and guiding configuration including a band encircling the neck or chest, in particular for a dog or some other four-legged animal, but also as a chest harness for a child learning to walk.

Prior-art dog collars utilize a ring, which, via a closure, can be adapted circumferentially to the neck of a dog. The collar is made of a material that is not particularly elastic. An alternative material is chain links that are looped through a steel ring such that, when the dog pulls sharply on the chain, the loop narrows around its neck. Such dog collars also have eyelets on which leads can be fastened by hooks.

The problem is that, although dogs usually wear a collar or a chest harness, the dog's owner often does not have a lead available or considers it too laborious to attach such a lead for a brief period of time and thus does not put the lead on, for example when getting into, or out of, a motor vehicle or guiding a dog in a building. However, in this case, the dog's owner then has to guide the animal directly by the collar or the chest harness And, as a result of the relatively low height of the animal, the owners must physically exert themselves.

SUMMARY OF THE INVENTION

It is accordingly an object of the invention to provide a retaining and guiding configuration that overcomes the hereinafore-mentioned disadvantages of the heretofore-known devices of this general type and that serves as a lead replacement and is always carried along without a person or animal being impeded.

With the foregoing and other objects in view, there is provided, in accordance with the invention, a retaining and guiding configuration, in particular for a four-legged animal such as a dog or a toddler learning to walk, including an inner band encircling a neck of the animal or toddler. The inwardly directed inner band has an outer surface and an outer band guided over the outer surface of the inner band. The outer band is extendable elastically counter to a restoring force.

In accordance with another feature of the invention, the outer band is an elastic band or elastic table. The elastic outer band can include stretch material such as rubber.

In accordance with another feature of the invention, the outer band has a first expansion region and an end region and an expansion limit. The outer band expands more in the first expansion region from an initial expansion, producing a small amount of prestressing, with an only slightly increasing tensile force and expands less in the end region up to the expansion limit.

In accordance with another feature of the invention, the outer band has an amount of prestressing and the amount of prestressing is adapted to the weight of the animal.

In accordance with another feature of the invention, the retaining and guiding configuration includes an outer sleeve connected to the inner band. The outer sleeve partially houses the outer band.

In accordance with another feature of the invention, the outer band has an outlet region and the outer sleeve is made from synthetic woven fabric having a border heat-sealed in the outlet region of the outer band.

In accordance with another feature of the invention, the retaining and guiding configuration includes a coating covering a surface of the inner band contacting the elastic outer band. The coating also can cover a surface of the outer sleeve contacting the elastic outer band.

In accordance with another feature of the invention, the retaining and guiding configuration includes a hand grip around the outer band.

In accordance with another feature of the invention, the outer band has two ends and the inner band includes a closure. The ends of the outer band are located near the closure.

In accordance with another feature of the invention, the outer band is guided freely around the inner band.

In accordance with another feature of the invention, the inner band defines a plurality of passages, and the outer band includes a buckle. The buckle inserts through one of the plurality of passages.

In accordance with another feature of the invention the outer band defines a plurality of passages, and the inner band includes a buckle. The buckle inserted through one of the plurality of passages.

In accordance with another feature of the invention, a subregion and a grip form a mount for an end of the outer band. The retaining and guiding configuration then include a resilient elastic producing a restoring force configured in the mount connected to the end of the outer band. The outer band is extended counter to the restoring force.

With the objects of the invention in view, there is also provided a method for training a toddler learning to walk. The first step includes providing a band encircling a neck of a child including an inwardly directed inner band having an outside and an outer band guided over the outside of the inner band, the outer band being extendable elastically counter to a restoring force. The next step is holding the outer band while the child walks. The final step is preventing the child from falling by supporting the elastically extended outer band.

The retaining and guiding configuration, possibly in addition to other straps, has an inwardly directed inner band and an outer band guided over the outside of the inner band. The outer band is configured such that it can be lengthened or extended elastically counter to a restoring force. This configuration provides a fixed collar or chest harness that a dog or other animal provided therewith cannot slip off. In addition, the configuration allows the dog to be guided comfortably, even without a lead, by the lengthening outer band without the dog's owner having to assume an uncomfortable posture or the collar narrowing in diameter and choking the animal, as is the case with the prior-art loop-type collars. This configuration, at the same time, satisfies the appropriate regulations wherever a lead has to be used.

According to a particularly simple embodiment of the invention, the outer band is configured as an elastic band or as a flat elastic tube which, when not in use, is positioned, with a small amount of prestressing, in a slightly expanded state against the inner band, with the result that it does not bother the dog and does not form any loops on which an animal could catch itself and thus hurt itself. Such an elastic band preferably includes a rubber or stretch-material band that remains permanently tear-resistant and elastic.

It is also particularly advantageous that the expansion of the elastic outer band is very great in a first expansion region from the initial expansion, producing a small amount of prestressing, with an only slightly increasing tensile force and decreases to a pronounced extent in an end region of the maximum extensibility of the outer band up to the expansion limit. This ensures, for example, that first of all an adaptation in length is achieved between a dog and a person, both in a standing position, without the person or the dog being subjected to high retaining forces. When the expansion limit is reached, the expansion decreases pronouncedly and particularly smoothly with the result that the physical strain on a dog owner is further reduced.

It is advantageous, according to a further innovation, that the expansibility and the expansion behavior of the elastic outer band are adapted to the size and/or the weight of an animal, with the result that only a low force is necessary for the initial expansion in the first expansion region for small lightweight dogs, with the expansibility, in contrast, being all the greater, whereas a higher force is necessary for the initial expansion in the first expansion region for large heavy dogs, with the expansibility, in contrast, being lower than in the case of retaining and guiding configurations for small dogs, in order for it to be possible, despite the supposed compliance of the configuration, to exert effective control over a dog immediately.

In accordance with a further feature of the invention, part of the outer band runs in an outer sleeve that is connected to the inner band. It is thus possible for the outer sleeve to be produced from robust material, for example leather or resistant plastic. The outer sleeve protects the elastic outer band against mechanical influences, such as attempted biting or soiling.

The invention can include an outer sleeve made of synthetic woven fabric. The woven fabric has a border that is heat-sealed in the outlet region of the outer band. This produces a smooth, resistant opening that is made available for the outer band, which constantly moves out and back again when in use. Since, in the case of an embodiment of the inventive configuration made of leather, pronounced friction, and thus wear, may occur between the inner band, outer band or outer sleeve, a further preferred embodiment of the invention is provided, at least on a few of those surfaces which are in sliding contact with the elastic outer band, with a sliding-action layer or coating.

Also advantageous is the use of a hand grip that either is inserted between two sections of the outer band or is configured around an outer band. The remaining sections, in the case of a hand grip positioned therebetween, considerably reduce the extent of possible lengthening in relation to a version in which the hand grip is guided freely around the outer band. Although this may be utilized to a more or less advantageous extent depending on the desired use for large or small animals. The hand grip itself improves the handling of the retaining and guiding configuration to a considerable extent and likewise serves to protect the outer band.

The dog collar or a chest harness is preferably provided with a closure via which it can be adapted to different neck widths or chest circumferences. The ends of the outer band can be configured as closely as possible to the region of the closure, in order for the longest possible effective length of the elastic outer band to be obtained.

According to another advantageous embodiment of a dog collar, however, the latter may also be configured in a closed state, with the result that it can simply be slipped over the head of a dog.

Considered as being additionally advantageous is a buckle that can be adjusted over the circumference of the dog collar. The buckle allows the inner band and the outer band to be secured against one another. The result allows the determination of the maximum lengthening capacity via the as yet free length of the section of the outer band.

Alternatively or cumulatively, the invention includes a mechanical solution for the extensibility of the outer band in which a subregion and/or the grip forms a mount for at least one end of the outer band, and configured in the mount or the grip is a resilient elastic element which moves the outer band back into the mount once it has been drawn out.

According to a further preferred embodiment of the retaining and guiding configuration, the latter is configured as a walking harness for a toddler learning to walk. If the toddler falls, the toddler is caught gently, rather than jerkily, by the elastic band. When the harness is not in use, the child can continue to crawl or play without his/her freedom of movement being impeded to any considerable extent because there are no obstructive parts such as leads or retaining loops configured on the walking harness.

Other features which are considered as characteristic for the invention are set forth in the appended claims.

Although the invention is illustrated and described herein as embodied in a retaining and guiding configuration, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
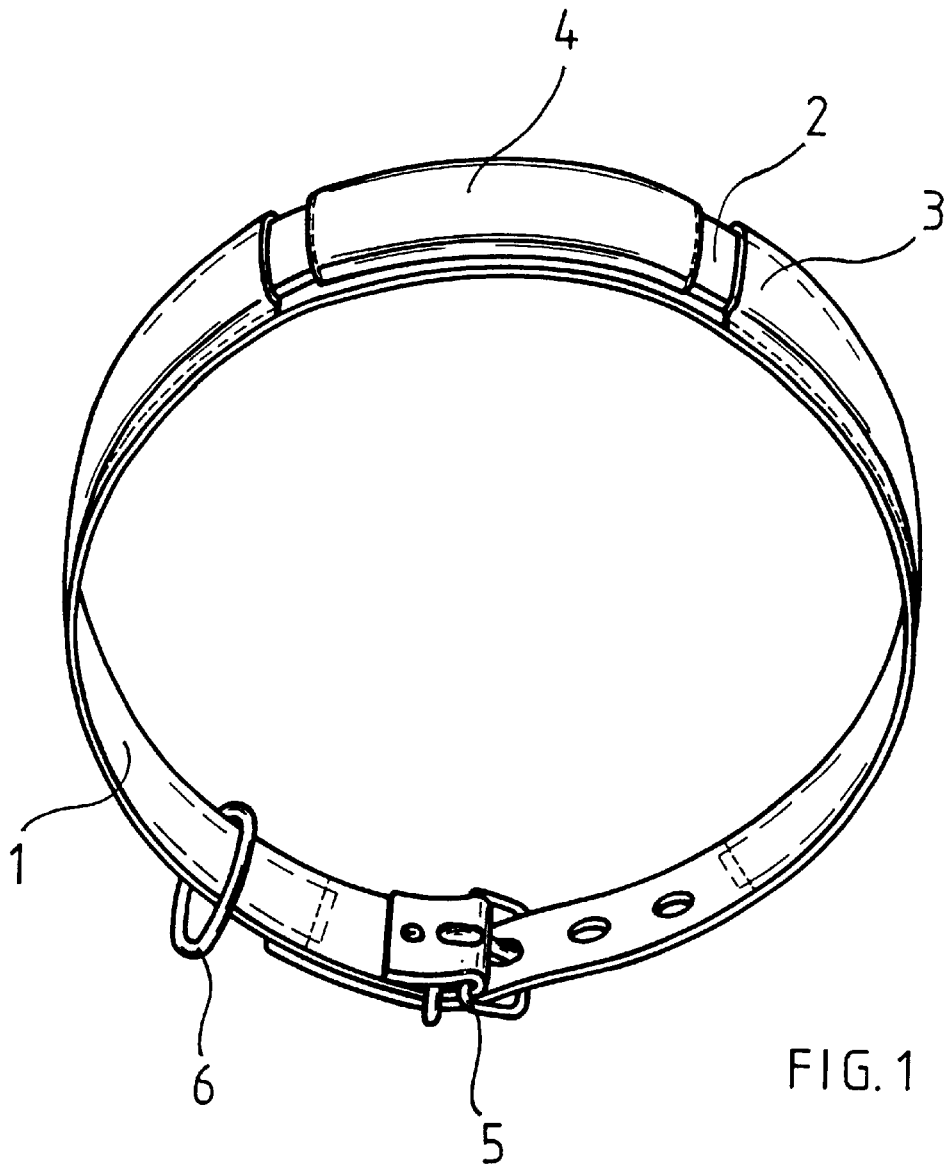
FIG. 1 shows a perspective view of a retaining and guiding configuration configured as a dog collar.

The dog collar or a chest strap 7 of the chest harness includes an inner band 1;11 and an outer sleeve 3;13 sewn to the borders of the inner band. Mounted therebetween is an elastic outer band 2;12 which a person can grip by hand, and draw out, in a subregion of the dog collar without the outer sleeve 3;13. In the subregion, the outer band 2;12 is enclosed by a hand grip 4;14 through which the outer band 2;12 extends freely in order for the longest possible effective length of the elastic outer band 2;12 to be obtained. However, it is also possible for the ends of the outer band 2;12 to be sewn to a hand grip 4;14.

The dog collar according to FIG. 1 also has an adjustable closure 5 and an eyelet 6 for fastening a conventional dog lead. The chest harness according to FIG. 4 likewise has a closure 15 and an eyelet 16 and, in addition, a neck strap 8 and connecting webs 9,10 configured between the chest strap 7 and neck strap 8, further closures 15 being inserted where necessary.

Figure 2:
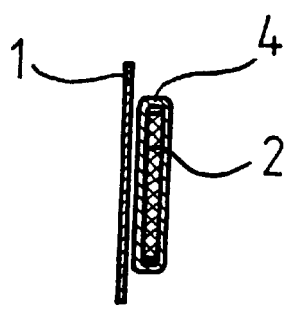
FIG. 2 shows a cross sectional view through line I in FIG. 1.

As illustrated in FIG. 2, the elastic outer band 2 extends through a hand grip 4, which encloses the elastic outer band 2, with the result, that the effective length of the outer band 2 is optimized.

Figure 3:
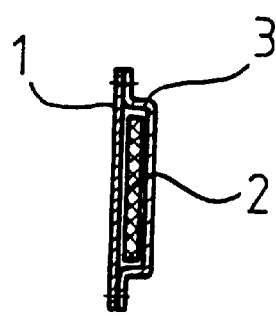
FIG. 3 shows a cross sectional view through line II in FIG. 1.

FIG. 3 illustrates how the outer band 2 is retained freely between the inner band 1 and outer sleeve 3. In particular, in an embodiment of the retaining and guiding configuration made of leather, the sides of the inner band 1 (i.e., the outer side of the inner band) and of the outer sleeve 3, which are directed toward the outer band 2, are provided with a sliding-action layer or coating.

Figure 4:
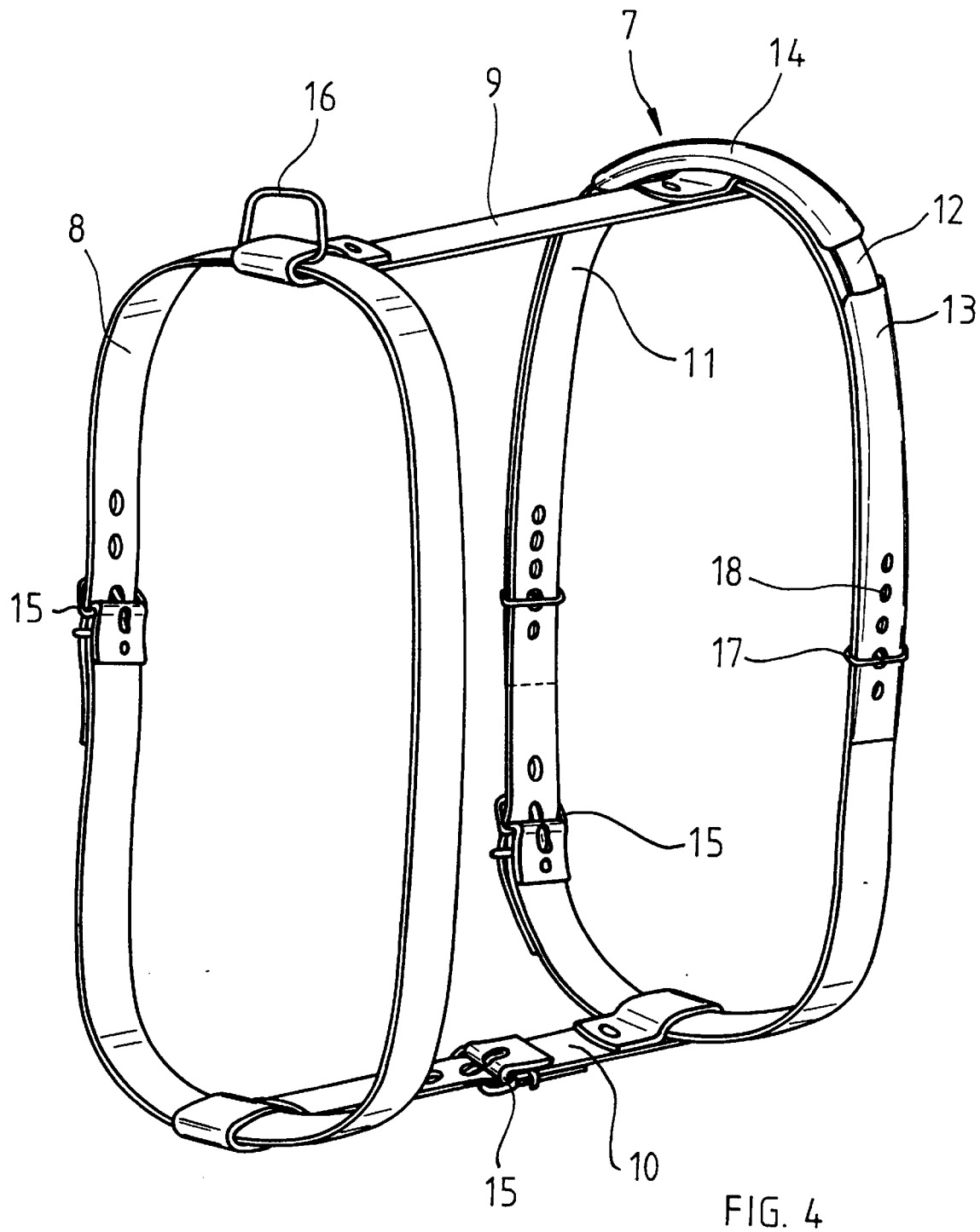
FIG. 4 shows a perspective view of a retaining and guiding configuration configured as a chest harness.

As is illustrated in FIG. 4, the retaining and guiding configuration has through-passages 18 in the inner band 11 and the outer sleeve 13 and a buckle 17 that can be adjusted over the circumference of the retaining and guiding configuration. The buckle allows the inner band 11 and the outer band 12 can be secured against one another. The extent of the maximum capacity for lengthening or extension can be set in a freely selectable manner in dependence on the as yet free section of the outer band 12.

Not illustrated in the drawing is an embodiment of the invention in which, alternatively, only the front neck strap 8 or else both the neck strap 8 and the chest strap 7 can be provided with an elastic outer band 12, in which case it should be possible for the hand grip 14 either to be configured on the front neck strap 8 or to be configured itself as a connecting web 9. The elastic outer band 12 can be formed from a elastic band or elastic hose. Furthermore, it should also be possible for a hand grip 14 placed in position above a connecting web 9 according to FIG. 4 to be mounted elastically.

I claim:

1. A retaining and guiding configuration for an animal, comprising:
   an inwardly directed inner band for encircling a neck of an animal, said inner band having an outer side and being a fixed collar with a preset length;
   an outer band guided over said outer side of said inner band, said outer band being extendable elastically counter to a restoring force; and
   an outer sleeve connected to said inner band, said outer sleeve partially housing said outer band.

2. The retaining and guiding configuration according to claim 1, wherein said outer band is an elastic band.

3. The retaining and guiding configuration according to claim 2, wherein said elastic outer band includes stretch material.

4. The retaining and guiding configuration according to claim 3, wherein said stretch material is rubber.

5. The retaining and guiding configuration according to claim 1, wherein said outer band is an elastic hose.

6. The retaining and guiding configuration according to claim 5, wherein said elastic hose includes a stretch material.

7. The retaining and guiding configuration according to claim 6, wherein said stretch material is rubber.

8. The retaining and guiding configuration according to claim 1, wherein said outer band has a first expansion region, an end region, and an expansion limit, and said outer band expands more in said first expansion region from an initial expansion and produces prestressing with an increasing tensile force, and expands less in said end region up to said expansion limit.

9. The retaining and guiding configuration according to claim 1, wherein said outer band has an amount of prestressing adapted to a weight of the animal.

10. The retaining and guiding configuration according to claim 1, wherein said outer band has an outlet region and said outer sleeve is made from synthetic woven fabric having a border heat-sealed in said outlet region of said outer band.

11. The retaining and guiding configuration according to claim 1, wherein said inner band has a surface contacting said elastic outer band, and a coating covers said surface of said inner band.

12. The retaining and guiding configuration according to claim 1, wherein said outer sleeve has a surface contacting said elastic outer band, and a coating covers said surface of said outer sleeve.

13. The retaining and guiding configuration according to claim 1, including a hand grip around said outer band.

14. The retaining and guiding configuration according to claim 13, wherein said outer band is guided freely around said inner band.

15. The retaining and guiding configuration according to claim 1, wherein said inner band defines a plurality of passages, and said outer band includes a buckle, and said buckle is inserted through one of said plurality of passages.

16. The retaining and guiding configuration according to claim 1, wherein said outer band defines a plurality of passages, and said inner band includes a buckle, and said buckle is inserted through one of said plurality of passages.

17. The retaining and guiding configuration according to claim 1, wherein said outer band has an end, a subregion and a grip form a mount for said end of said outer band, said mount has a resilient elastic producing a restoring force, said resilient elastic is connected to said end of said outer band, and said outer band is extended counter to said restoring force.

18. A walking harness for a toddler learning to walk, comprising:
   an inwardly directed inner band for encircling a neck of a toddler, said inner band having an outer side and being a fixed collar with a preset length;
   an outer band guided over said outer side of said inner band, said outer band being extendable elastically counter to a restoring force; and
   an outer sleeve connected to said inner band, said outer sleeve partially housing said outer band.

19. A retaining and guiding configuration for an animal, comprising:
   an inwardly directed inner band for encircling a neck of an animal, said inner band having an outer side and being a fixed collar with a preset length; and
   an outer band guided over said outer side of said inner band, said outer band being extendable elastically counter to a restoring force, said outer band having two ends, said inner band including a closure, and said ends of said outer band being near said closure.

* * * * *